United States Patent
Nagata et al.

(10) Patent No.: US 11,373,447 B2
(45) Date of Patent: Jun. 28, 2022

(54) SYSTEMS INCLUDING IMAGE DETECTION TO INHIBIT VEHICLE OPERATION

(71) Applicant: TOYOTA MOTOR ENGINEERING & MANUFACTURING NORTH AMERICA, INC., Plano, TX (US)

(72) Inventors: Katsumi Nagata, Foster City, CA (US); Prathap Alvakonda, Plano, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 129 days.

(21) Appl. No.: 16/794,594

(22) Filed: Feb. 19, 2020

(65) Prior Publication Data
US 2021/0256248 A1 Aug. 19, 2021

(51) Int. Cl.
G06V 40/16 (2022.01)
B60W 50/14 (2020.01)
B60W 40/08 (2012.01)
G06V 20/59 (2022.01)

(52) U.S. Cl.
CPC ........... G06V 40/174 (2022.01); B60W 40/08 (2013.01); B60W 50/14 (2013.01); G06V 20/597 (2022.01); B60W 2050/143 (2013.01)

(58) Field of Classification Search
CPC .......... G06K 9/00302; G06K 9/00845; B60W 40/08; B60W 50/14; B60W 2050/143
See application file for complete search history.

(56) References Cited

U.S. PATENT DOCUMENTS

| 8,344,849 | B2 | 1/2013 | Larsson et al. |
| 9,043,048 | B2 | 5/2015 | Manotas, Jr. |
| 10,053,113 | B2* | 8/2018 | Singh ..................... B60W 50/14 |
| 10,559,307 | B1* | 2/2020 | Khaleghi ................ G10L 15/26 |
| 2006/0097844 | A1 | 5/2006 | Nakashima et al. |
| 2017/0313324 | A1* | 11/2017 | Kumai ................ B60W 50/082 |
| 2017/0357866 | A1* | 12/2017 | Welland ................... B60R 1/00 |
| 2017/0364070 | A1* | 12/2017 | Oba ..................... B60K 28/066 |

(Continued)

FOREIGN PATENT DOCUMENTS

| CN | 101693443 A | 4/2010 |
| CN | 201756065 U | 3/2011 |

(Continued)

OTHER PUBLICATIONS

Car security system using biometrics (https://www.academia.edu/32350438CAR_SECURITY_SYSTEM_USING_BIOMETRICS), accessed Sep. 4, 2019, 6 pages.

(Continued)

Primary Examiner — Santiago Garcia
(74) Attorney, Agent, or Firm — Dinsmore & Shohl LLP (57) ABSTRACT

A system including a vehicle electronic control unit, an imaging device, and a controller is disclosed. The controller includes a processor and memory storing computer-readable medium including executable instructions that, when executed by the processor, cause the controller to capture an image of an operator of a vehicle by the imaging device, determine a facial expression of the operator, and transmit a vehicle operation command to the vehicle electronic control unit. The vehicle operation command causes the vehicle electronic control unit to perform a vehicle operation action based on the facial expression of the operator and an operation state of the vehicle.

13 Claims, 4 Drawing Sheets

(56) References Cited

U.S. PATENT DOCUMENTS

| | | | |
|---|---|---|---|
| 2018/0043829 A1* | 2/2018 | Cordell | G08G 1/143 |
| 2018/0061415 A1 | 3/2018 | Penilla et al. | |
| 2018/0182185 A1* | 6/2018 | Tong | G08G 1/143 |
| 2018/0288182 A1* | 10/2018 | Tong | B60R 1/00 |
| 2019/0276047 A1* | 9/2019 | Suzuki | B60W 50/14 |
| 2019/0279009 A1* | 9/2019 | Srirangam Narashiman | G06T 7/248 |
| 2020/0213560 A1* | 7/2020 | Zhang | B60K 37/06 |
| 2020/0269848 A1* | 8/2020 | Kang | B60W 60/0055 |
| 2020/0298801 A1* | 9/2020 | Dingli | G08B 13/19647 |
| 2020/0346658 A1* | 11/2020 | Deng | G06K 9/00845 |
| 2021/0009141 A1* | 1/2021 | Lu | B60R 1/00 |
| 2021/0078605 A1* | 3/2021 | Namba | B60W 40/09 |
| 2021/0195981 A1* | 7/2021 | Ghaffarzadegan | G02B 27/017 |
| 2021/0221404 A1* | 7/2021 | Reiner | G05D 1/0055 |

FOREIGN PATENT DOCUMENTS

| | | |
|---|---|---|
| CN | 202439657 U | 9/2012 |
| CN | 204695414 U | 10/2015 |
| CN | 108394378 A | 8/2018 |
| CN | 108725385 A | 11/2018 |
| CN | 109398306 A | 3/2019 |
| IN | 1995/CHE/2013 A | 6/2013 |
| WO | 2017124482 A1 | 7/2017 |

OTHER PUBLICATIONS

Access System with Biometric Elements (https://www.continental-automotive.com/en-gl/Passenger-Cars/Interior/Comfort-Security/Access-Control-Systems/Biometric-Access), accessed Sep. 4, 2019, 2 pages.

Facial recognition in your vehicle (https://laurenfix.com/article/facial-recognition-vehicle/), Automotive Aspects © 2019, 2 pages.

Face recognition technology: much more than just unlocking the car (https://skybiometry.com/face-recognition-in-cars/), Dec. 12, 2018, 3 pages.

* cited by examiner

SYSTEMS INCLUDING IMAGE DETECTION TO INHIBIT VEHICLE OPERATION

TECHNICAL FIELD

The present specification generally relates to systems for preventing operation of a vehicle and, more specifically, systems that prevent operation of a vehicle based on a facial expression of a driver of the vehicle or a state of an object within the vehicle.

BACKGROUND

Vehicles are equipped with various features for ensuring that a vehicle is driven in an appropriate manner. For example, vehicles may be equipped with sensors for determining whether a driver is paying attention to the road. As such, vehicles may be provided with sensors for determining the line of sight of the driver and alerting the driver when he or she is not paying attention to the road for a predetermined amount of time. However, these sensors fail to take into consideration an emotional state of the driver. When exhibiting a heightened emotional state, humans may display associated facial expressions. While in a distressed emotional state, a driver of a vehicle may not be fit to operate the vehicle until he or she can calm his or her emotions and regain a focus on driving.

In addition, vehicles are equipped with seatbelt detection sensors and door sensors for determining when a seatbelt is unbuckled and a door is left ajar, respectively. When this is the case, a vehicle will typically alert the driver of this condition by providing an audible alert indicating that some feature of the vehicle needs attention. However, these alerts can be disabled or easily overlooked as many occupants do not buckle their seatbelts when in a vehicle.

Accordingly, a need exists for alternative systems and methods for preventing use of a vehicle during driving conditions in which the driver of the vehicle may be impaired or an object in the vehicle may be in an inappropriate state for driving.

SUMMARY

In one embodiment, a system includes a vehicle electronic control unit, an imaging device, and a controller. The controller includes a processor and memory storing computer-readable readable medium including executable instructions that, when executed by the processor, cause the controller to capture an image of an operator of a vehicle by the imaging device, determine a facial expression of the operator, and transmit a vehicle operation command to the vehicle electronic control unit. The vehicle operation command causes the vehicle electronic control unit to perform a vehicle operation action based on the facial expression of the operator and an operation state of the vehicle.

In another embodiment, a system includes a vehicle electronic control unit, an imaging device, and a controller. The controller includes a processor and memory storing computer-readable medium including executable instructions that, when executed by the processor, cause the controller to capture a real-time image of at least one object within a vehicle by the imaging device, compare the real-time image of the at least one object to a baseline image of the at least one object, determine a state of the at least one object based on differences between the baseline image and the real-time image, and transmit a vehicle operation command to the vehicle electronic control unit to perform a vehicle operation action based on the state of the at least one object and an operation state of the vehicle.

In yet another embodiment, a method for inhibiting operation a vehicle includes capturing an image of an operator of the vehicle by an imaging device, determining a facial expression of the operator, and transmitting a vehicle operation command to a vehicle electronic control unit of the vehicle to perform a vehicle operation action based on the facial expression of the operator and an operation state of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made in detail to embodiments of the system described herein, examples of which are illustrated in the accompanying drawings. Whenever possible, the same reference numerals will be used throughout the drawings to refer to the same or like parts.

Figure 2:
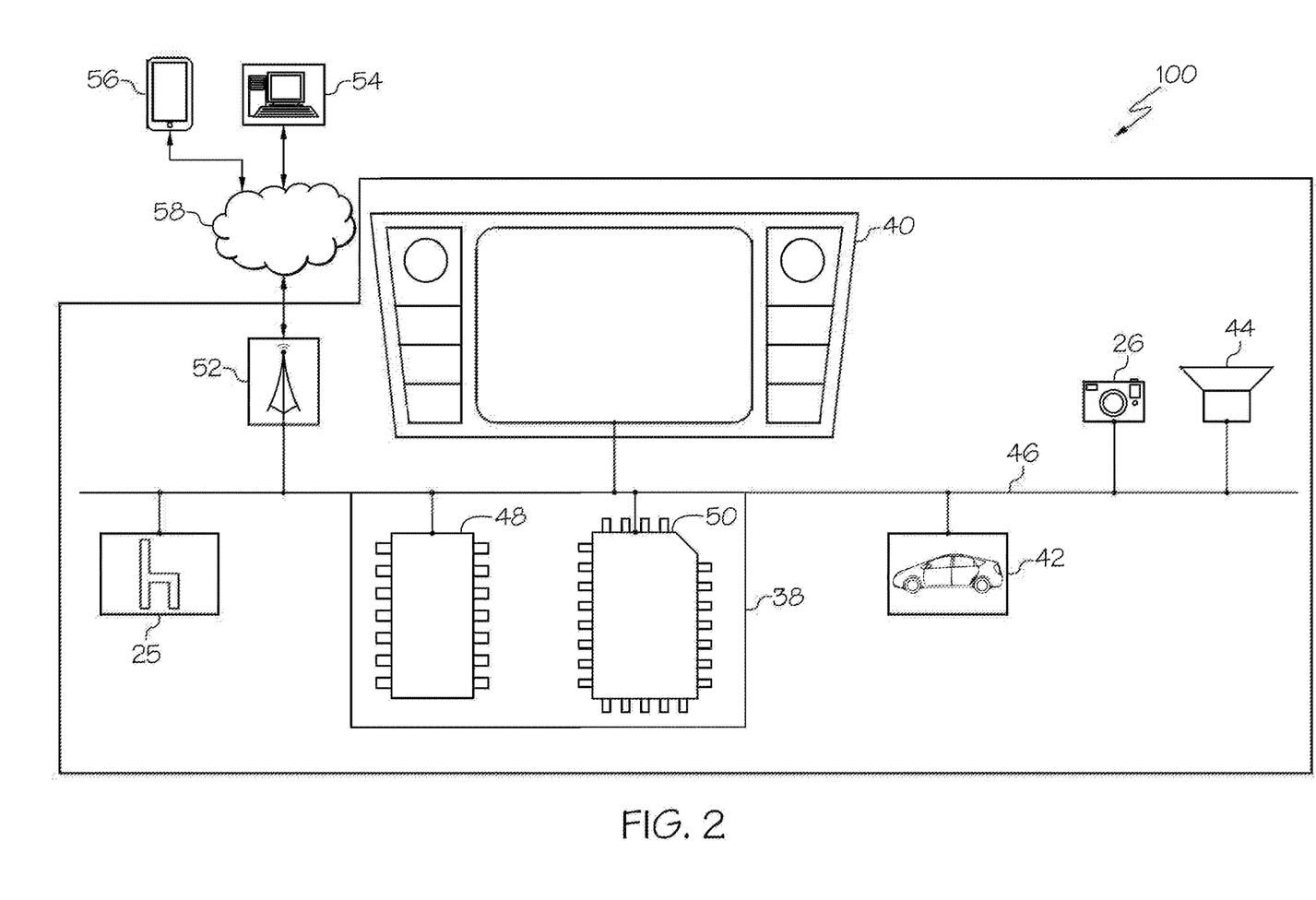
FIG. 2 depicts a schematic view of a system, according to one or more embodiments shown and described herein.

In some embodiments, a system is schematically depicted in FIG. 2 and generally includes a controller including a processor and a memory, an imaging device, and a vehicle electronic control unit. In the system, the imaging device captures an image of an operator of a vehicle, the processor determines a facial expression of the operator, and a vehicle operation command is transmitted to the vehicle electronic control unit to perform a vehicle operation action based on the facial expression of the operator and an operation state of the vehicle. Various embodiments of the system and the operation of the system are described in more detail herein.

Figure 1:
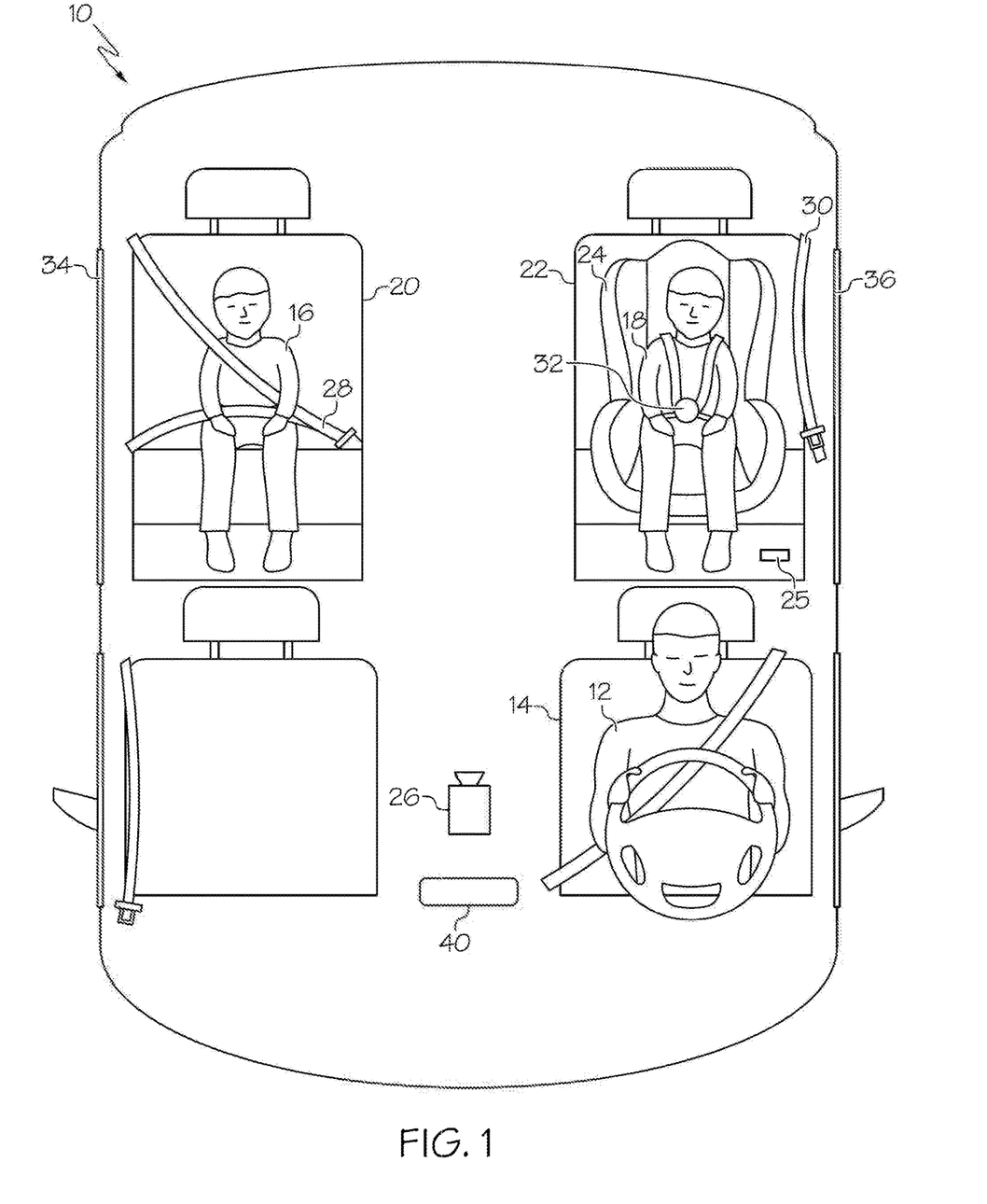
FIG. 1 depicts a front view of a vehicle interior, according to one or more embodiments shown and described herein.

Referring now to FIG. 1, a vehicle 10 is illustrated according to one or more embodiments described herein. A driver 12 sitting in a driver seat 14 and a pair of passengers 16, 18 sitting in respective second row seats 20, 22 are illustrated in the vehicle 10. As shown, the passenger 18 is also sitting in a car seat 24 in the seat 22. The vehicle 10 may include further seats not shown in FIG. 1, for example, a third row of seats, and the like. In some embodiments, the seat 22 may include an occupant detection sensor 25. Although not shown, it is to be understood that the seat 20 may also include an occupant detection sensor as well.

In embodiments, an imaging device 26 is placed within the vehicle 10 at a position suitable for capturing at least an image of the driver 12 of the vehicle 10 and specifically a facial expression of the driver 12. In some embodiments, the imaging device 26 is positioned to identify a state of various objects in the vehicle 10, such as a position of the passengers 16, 18 within the vehicle 10, a seat belt 28, 30 on each seat 20, 22, a restraining strap 32 on the car seat 24, or the doors, such as rear doors 34, 36, of the vehicle 10 to determine if these objects are in their intended positions. While FIG. 1 depicts one imaging device 26, the vehicle 10 may include additional imaging devices. For example, the vehicle 10 may include one imaging device for capturing images of the driver 12 and a second imaging device for capturing images of the second row of seats 20, 22 and/or passengers 16, 18 seated therein. The imaging device 26 transmits the captured images to a controller 38, as shown in FIG. 2 and described in more detail below. The controller 38 processes the images to identify a facial expression of the driver 12 of the vehicle 10 and/or a state of an object in the vehicle 10.

As shown in FIG. 1, the vehicle 10 includes a display device 40 to display a notification as a result of the image detected by the imaging device 26 and an associated vehicle operation action to be performed based on a determination made by the controller 38. As discussed in more detail in FIG. 2, the display device 40 may be configured to provide one or more user interfaces and may be configured as a touch screen and/or include other features for receiving user input.

Referring now to FIG. 2, an embodiment of a system 100 is schematically depicted. The system 100 includes the controller 38, a vehicle electronic control unit (ECU) 42, the imaging device 26, the display device 40, the occupant detection sensor 25, an audible feedback device 44, network interface hardware 52, and a communication path 46. The various components of the system 100 will now be described.

The controller 38 includes a processor 48 and a non-transitory electronic memory 50 to which various components are communicatively coupled, as will be described in further detail below. In some embodiments, the processor 48 and the non-transitory electronic memory 50 and/or the other components are included within a single device. In other embodiments, the processor 48 and the non-transitory electronic memory 50 and/or the other components may be distributed among multiple devices that are communicatively coupled.

The controller 38 includes the non-transitory electronic memory 50 that stores a set of machine readable instructions. The processor 48 executes the machine readable instructions stored in the non-transitory electronic memory 50. The non-transitory electronic memory 50 may comprise RAM, ROM, flash memories, hard drives, or any device capable of storing machine readable instructions such that the machine readable instructions can be accessed by the processor 48. The machine readable instructions comprise logic or algorithm(s) written in any programming language of any generation (e.g., 1GL, 2GL, 3GL, 4GL, or 5GL) such as, for example, machine language that may be directly executed by the processor 48, or assembly language, object-oriented programming (OOP), scripting languages, microcode, etc., that may be compiled or assembled into machine readable instructions and stored in the non-transitory electronic memory 50. Alternatively, the machine readable instructions may be written in a hardware description language (HDL), such as logic implemented via either a field-programmable gate array (FPGA) configuration or an application-specific integrated circuit (ASIC), or their equivalents. Accordingly, the system described herein may be implemented in any conventional computer programming language, as pre-programmed hardware elements, or as a combination of hardware and software components. The non-transitory electronic memory 50 may be implemented as one memory module or a plurality of memory modules.

In some embodiments, the non-transitory electronic memory 50 includes instructions for executing the functions of the system 100. The instructions may include instructions for determining a facial expression of the driver 12, instructions for determining a state of an object in the vehicle 10, and instructions for determining a vehicle operation command corresponding to the facial expression of the driver 12 or state of the object in the vehicle 10, and a current operation state of the vehicle 10.

The instructions for determining the facial expression, when executed by the processor 48, may determine a facial expression of a captured image by the imaging device 26. The different facial expressions may include happy, smile, sad, surprise, angry, fear, disgust, etc. The instructions for determining a facial expression may include an image recognition algorithm.

The instructions for determining the state or condition of an object in the vehicle 10, such as a passenger 16, 18, seat belt 28, 30, car seat 24, a door 34, 36, or the like, when executed by the processor 48, may determine a state of an object in the vehicle 10 of a captured image by the imaging device 26 and, in some embodiments. The negative state of the objects may include an unbuckled seat belt when a passenger is in the seat, an unrestrained car seat when a passenger is in the car seat, an opened door, and the like. The instructions for determining a state of an object may include an image recognition algorithm.

The instructions for determining a vehicle operation command, when executed by the processor 48, may determine a vehicle operation command based on a facial expression or a state of an object in the vehicle 10. For example, different vehicle operation commands may be initiated for different facial expressions, such as smiling and angry facial expressions. In addition, different vehicle operation commands may be initiated for different states of objects in the vehicle. The functionality of these instructions will be described in further detail below.

The processor 48 may be any device capable of executing machine readable instructions. For example, the processor 48 may be an integrated circuit, a microchip, a computer, or any other computing device. The non-transitory electronic memory 50 and the processor 48 are coupled to the communication path 46 that provides signal interconnectivity between various components and/or modules of the system 100. Accordingly, the communication path 46 may communicatively couple any number of processors with one another, and allow the modules coupled to the communication path 46 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 46 may be formed from any medium that is capable of transmitting a signal such as, for example, conductive wires, conductive traces, optical waveguides, or the like. Moreover, the communication path 46 may be formed from a combination of mediums capable of transmitting signals. In some embodiments, the communication path 46 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As schematically depicted in FIG. 2, the communication path 46 communicatively couples the processor 48 and the non-transitory electronic memory 50 of the controller 38 with a plurality of other components of the system 100. For example, the system 100 depicted in FIG. 2 includes the processor 48 and the non-transitory electronic memory 50 communicatively coupled with the vehicle ECU 42, the display device 40, the imaging device 26, the occupant detection sensor 25, and the audible feedback device 44.

As used herein, the vehicle ECU 42 refers to any embedded system that controls one or more of the electrical systems or subsystems in the vehicle 10. Exemplary vehicle ECUs include Airbag Control Units (ACU), Body Control Modules that control door locks, electric windows, courtesy lights, etc., Convenience Control Units (CCU), Door Control Units, Engine Control Units (ECU), Man Machine Interfaces (MMI), On-Board Diagnostics (OBD), Powertrain Control Modules (PCM), Seat Control Units, Speed Control Units, Telephone Control Units (TCU) that dial the telephone, Transmission Control Units (TCU), and the like. As such, it is to be understood that the vehicle ECU 42 referred to herein is configured to control the operation of the vehicle 10 and/or inhibit operation of the vehicle 10 in accordance with a vehicle operation command sent to the vehicle ECU 42 from the controller 38.

Referring still to FIG. 2, the display device 40 may output an alert message or notification in response to the initiated vehicle operation command from the controller 38 to the vehicle ECU 42. The display device 40 may include any medium capable of transmitting an optical output such as, for example, a cathode ray tube, light emitting diodes, a liquid crystal display, a plasma display, or the like. Moreover, the display device 40 may be a touchscreen that, in addition to providing optical information, detects the presence and location of a tactile input upon a surface of or adjacent to the display device 40. Accordingly, the display device 40 may receive mechanical input directly upon the optical output provided by the display device 40.

Still referring to FIG. 2, the imaging device 26 is coupled to the communication path 46 and communicatively coupled to the processor 48 of the controller 38. The imaging device 26 may be any device having an array of sensing devices (e.g., pixels) capable of detecting radiation in an ultraviolet wavelength band, a visible light wavelength band, or an infrared wavelength band. The imaging device 26 may have any resolution. The imaging device 26 may include an omni-directional camera, or a panoramic camera. In some embodiments, one or more optical components, such as a mirror, fish-eye lens, or any other type of lens may be optically coupled to the imaging device 26. The imaging device 26 may transmit the captured images to the processor 48 of the controller 38 via the communication path 46. It is appreciated that the system 100 may also include a peripheral audio sensor, either included in the imaging device 26 or separate therefrom. When the peripheral audio sensor is provided, the peripheral audio sensor alone may be utilized to determine the state of the driver or an object by detecting audio within the vehicle 10 or the peripheral audio sensor may be utilized to supplement and assist the imaging device 26 in order to more accurately determine the state of the driver or an object by identifying sounds within the vehicle 10 associated with a positive facial expression and a negative facial expression, as discussed in more detail herein.

The occupant detection sensor 25 is coupled to the communication path 46 such that the communication path 46 communicatively couples the occupant detection sensor 25 to other modules of the system 100. The occupant detection sensor 25 may include a proximity sensor. In some embodiments, the proximity sensor may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may include a weight sensor and may be configured to determine the presence of an object in a seat of the vehicle 10, such as seat 22, based on an output signal outputted by the weight sensor.

The audible feedback device 44 may be any device capable of providing audible feedback to a user. The audible feedback device 44 may include a speaker, headphones, or the like. In some embodiments, the audible feedback device 44 may be delivered to the user with the speaker or headphones in a 3-dimensional (3D) audio placement format.

In some embodiments, the system 100 includes network interface hardware 52 for communicatively coupling the system 100 to a server 54 and a portable device 56 via a network 58. The network interface hardware 52 can be communicatively coupled to the communication path 46 and can be any device capable of transmitting and/or receiving data via the network 58. Accordingly, the network interface hardware 52 can include a communication transceiver for sending and/or receiving any wired or wireless communication. For example, the network interface hardware 52 may include an antenna, a modem, LAN port, card, WiMax card, mobile communications hardware, near-field communication hardware, satellite communication hardware and/or any wired or wireless hardware for communicating with other networks and/or devices. In one embodiment, the network interface hardware 52 includes hardware configured to operate in accordance with the Bluetooth wireless communication protocol. Some embodiments may not include the network interface hardware 52.

Still referring to FIG. 2, the system 100 may be coupled to the portable device 56. For example, the system 100 may be communicatively coupled to the portable device 56 via the network 58. The portable device 56 may include, without limitation, a smartphone, a tablet, a personal media player, or any other electric device that includes wireless communication functionality.

Figure 3:
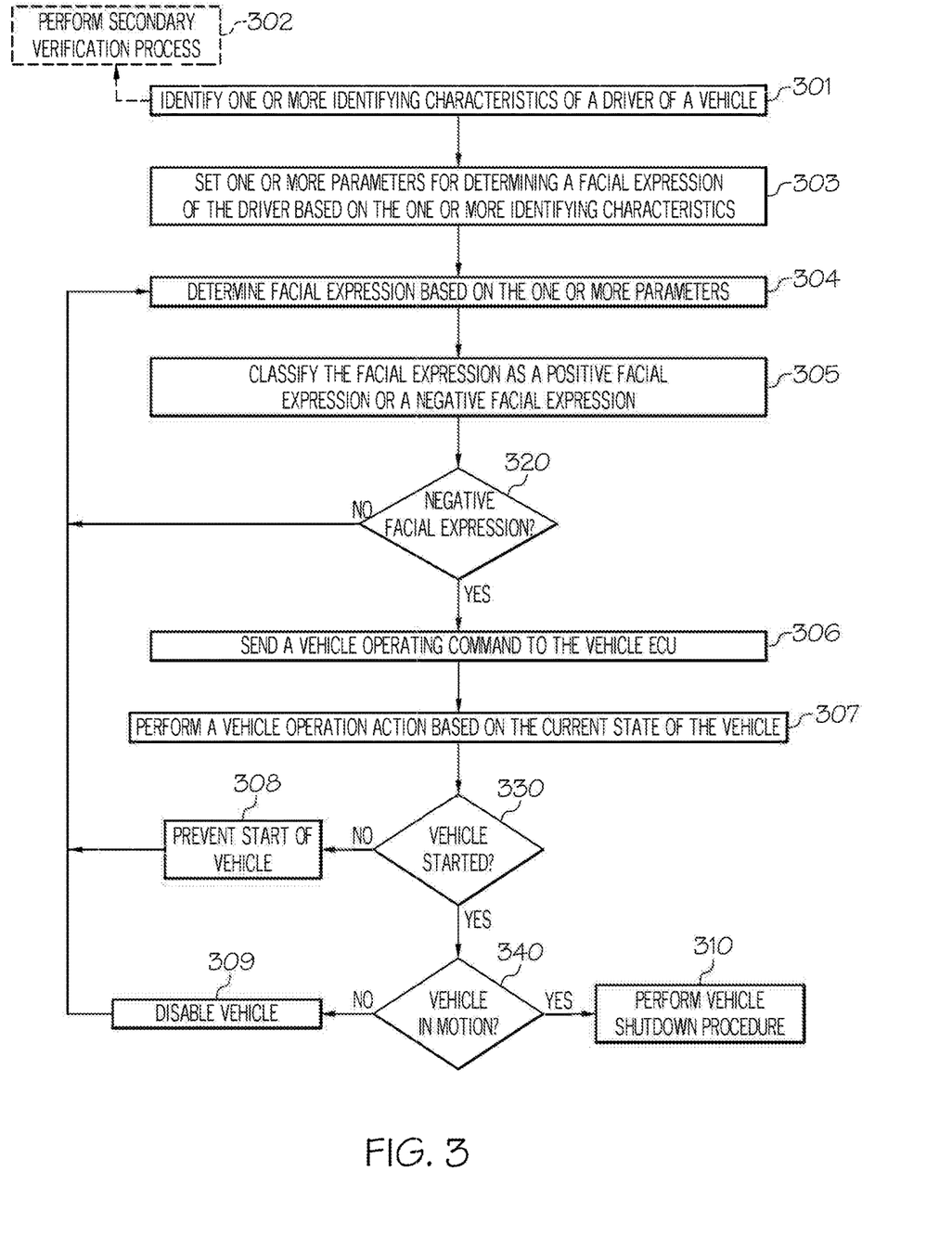
FIG. 3 depicts a flowchart illustrating an embodiment of a method for inhibiting operation of the vehicle based on a facial expression of a driver of the vehicle, according to one or more embodiments shown and described herein.

FIG. 3 depicts a flow chart of a method for operating a vehicle in accordance with one or more embodiments shown and described herein. More particularly, FIG. 3 depicts a method for operating the vehicle 10 based on a facial expression of the driver 12 of the vehicle 10. At block 301, the processor 48 of the controller 38 determines one or more identifying characteristics of the driver 12. In some embodiment, the processor 48 may determine the one or more identifying characteristics of the driver 12 based on an image of the driver 12 captured by the imaging device 26. The processor 48 may implement an image recognition algorithm on the face in the captured image to obtain one or more identifying characteristics of the driver 12. The one or more identifying characteristics of the driver may include an identity, a gender, an age, an ethnicity or cultural background, etc.

In some embodiments, at block 302 the system 100 may perform a secondary verification process to determine that the one or more identifying characteristics correspond to that of the driver 12. In this embodiment, the portable device 56 belonging to the driver 12 stores a profile including one or more identifying characteristics specific to the driver 12. Once the processor 48 determines the one or more identifying characteristics of the driver 12, a secondary verification signal is sent to the portable device 56 via the network 58 in order to retrieve the one or more identifying characteristics from the portable device 56. The one or more identifying characteristics determined by the processor 48 are then compared to the one or more identifying characteristics provided by the portable device 56. If the one or more identifying characteristics do not match, the driver 12 will be alerted via a notification or a message displayed on the display device 40. If this is the case, it may be possible that the imaging device 26 is malfunctioning or not correctly identifying or processing an image of the driver 12. In some embodiments, when the one or more identifying characteristics do not match, the processor 48 will utilize the one or more identifying characteristics from the portable device 56 instead of the one or more identifying determined by the imaging device 26.

At block 303, the processor 48 sets one or more parameters for determining a facial expression of the driver 12 based on the one or more identifying characteristics of the driver 12 determined at block 301, or block 302 if different. The one or more parameters may include parameters for common facial features including, but not limited to, parameters for teeth, parameters for eyes, parameters for an outer lip, parameters for a curvature of the face, etc. The processor 48 may set one or more parameters for determining a facial expression based on an identity of the driver 12. For example, if the processor 48 identifies the driver as a person A, then the processor 48 may set one or more parameters for determining a facial expression with respect to the person A. The setting of one or more parameters may include parameters associated with the person A's smiling facial expression, parameters associated with the person A's angry facial expression, etc.

In some embodiments, one or more parameters for determining a facial expression for the driver 12 may be retrieved from the non-transitory electronic memory 50. For example, if the processor 48 identifies the driver 12 as the person A, the processor 48 may retrieve parameters associated with the person A's various expressions, such as a smiling facial expression, an angry expression, etc. from the non-transitory electronic memory 50. In another embodiment, one or more parameters for determining a facial expression for the driver 12 may be retrieved from the server 54. For example, if the processor 48 identifies the driver 12 as the person B, the processor 48 may retrieve parameters associated with the person B's various expressions, such as a smiling facial expression, an angry expression, etc. from the server 54 via the network 58.

The processor 48 may set one or more parameters for determining a facial expression based on a gender of the driver 12. For example, if the processor 48 determines that the driver is a female, then the processor 48 may set one or more parameters for determining a facial expression of a female. The set one or more parameters may include parameters associated with average female's smiling facial expression, parameters associated with female's angry facial expression, etc. These parameters may be pre-stored in the non-transitory electronic memory 50 or retrieved from the server 54, and the processor 48 may receive the parameters.

The processor 48 may set one or more parameters for determining a facial expression based on an age of the subject. For example, if the processor 48 determines that the driver is a teenager, then the processor 48 may set one or more parameters for determining a facial expression of a teenager. The set one or more parameters may include parameters associated with average teenager's smiling facial expression, parameters associated with average teenager's angry facial expression, etc. These parameters may be pre-stored in the non-transitory electronic memory 50 or retrieved from the server 54, and the processor 48 may receive the parameters.

The processor 48 may set one or more parameters for determining a facial expression based on an ethnicity or cultural background of the subject. For example, if the processor 48 determines that the driver 12 is a person from ethnicity or cultural background A, then the processor 48 may set one or more parameters for determining a facial expression of a person from ethnicity or cultural background A. The set one or more parameters may include parameters associated with average person from ethnicity or cultural background A's smiling facial expression, parameters associated with average person from ethnicity or cultural background A's angry facial expression, etc. These parameters may be pre-stored in the non-transitory electronic memory 50 or retrieved from the server 54, and the processor 48 may receive the parameters.

At block 304, the processor 48 determines the facial expression of the driver 12 in the image taken by the imaging device 26 based on the one or more parameters set at block 303. The processor 48 may implement a facial expression recognition algorithm on the captured image to determine a facial expression in the image. The facial expression recognition algorithm employs the one or more parameters set at block 303. For example, when the driver 12 is determined to be a female at the age of 50 at block 301, the processor 48 implements the facial expression recognition algorithm using parameters for determining a facial expression of a female at the age of 50. The parameters for determining a facial expression of a female at the age of 50 may determine the facial expression of the driver 12 more accurately than parameters for determining a facial expression of general people. For example, the processor 48 may determine that a facial expression in the image is a smiling facial expression by implementing the facial expression recognition algorithm using parameters for determining a facial expression of a female at the age of 50. In contrast, the processor 48 may not accurately determine that a facial expression in the image is a smiling facial expression by implementing the facial expression recognition algorithm using parameters for determining a facial expression of general people because the parameters are not finely tuned to a female at the age of 50.

In some embodiments, when the driver 12 is determined as a person A at block 301, the processor 48 implements the facial expression recognition algorithm using parameters for determining a facial expression of person A. The parameters for determining a facial expression of person A may determine the facial expression of person A more accurately than parameters for determining a facial expression of general people. For example, the processor 48 may determine that a facial expression in the image is an angry facial expression by implementing the facial expression recognition algorithm using parameters for determining a facial expression of person A. In contrast, the processor 48 may not accurately determine that a facial expression in the image is an angry facial expression by implementing the facial expression recognition algorithm using parameters for determining a facial expression of general people because the parameters are not finely tuned to person A.

At block 305, the processor 48 classifies the facial expression as a positive facial expression or a negative facial expression. For example, if the processor 48 determines that the facial expression of the captured face is a happy facial expression or a smiling facial expression, the processor 48 classifies the facial expression as a positive facial expression. If the processor 48 determines that the facial expression of the captured face is sad facial expression or an angry facial expression, the processor 48 classifies the facial expression as a negative emotion. At decision block 320, it is determined whether the facial expression is a negative facial expression. If the facial expression is not determined to be a negative facial expression at decision block 320, the routine returns to block 304.

If the facial expression is determined to be a negative facial expression at decision block 320, the processor sends a vehicle operating command to the vehicle ECU 42 at block 306. Nonlimiting examples of a vehicle operating command may include instructions to either prevent start of the vehicle, disable the vehicle, or perform a shutdown procedure, as identified at blocks 308-310 below. At block 307, the vehicle ECU 42 processes the vehicle operating command and performs a vehicle operation action, such as one of those identified in the instructions of the vehicle operating command, based on the current operation state of the vehicle.

In some embodiments, after determining the facial expression at block 304, the driver may be permitted to confirm or deny the determined facial expression by operating the display device 40 or communicating with the portable device 56 in communication with the system 100. As such, the controller 38 is capable of utilizing machine-learning techniques to learn various facial expressions of the driver and adjusting the one or more parameters, or the one or more characteristics themselves, specific to the driver. This allows the processor 48 to better determine facial expressions of the driver and classify the facial expression as either a positive facial expression or a negative facial expression. This also allows for unique, personalized expressions to be captured and stored in the non-transitory memory 50 and/or in the server 54.

At decision block 330, it is determined whether the vehicle is started. If it is determined that the vehicle has started, the routine proceeds to decision block 340, as will be described below. If the vehicle ECU 42 determines in decision block 330 that the vehicle is not started (e.g., by determining that an ignition or battery of the vehicle 10 is in an off position), the vehicle ECU 42 will prevent the vehicle from switching to an on position until the processor 48 determines that the facial expression of the driver is no longer a negative facial expression at block 308. As such, the vehicle 10 is disabled to prevent operation of the vehicle 10 by the driver 12 who is not in an emotional state in which the driver 12 should be operating the vehicle 10. The routine returns to block 304 from block 308.

At decision block 340, it is determined whether the vehicle 10 is in motion. If the processor 48 determines that the vehicle 10 is not in motion at decision block 340, the routine proceeds to block 309 where vehicle is disabled. For example, at block 309, after the processor 48 identifies the facial expression of the driver 12 is a negative facial expression and sends the vehicle operating command to the vehicle ECU 42, if the vehicle ECU 42 determines that the vehicle 10 is in the on position (YES at decision block 330) and the vehicle 10 is in park (NO at decision block 340), the vehicle ECU 42 will switch the vehicle to the off position until the processor 48 determines that the facial expression of the driver 12 is no longer a negative facial expression. As such, the vehicle 10 is disabled to prevent operation of the vehicle 10 by the driver 12.

If the processor 48 determines that the vehicle 10 is in motion at decision block 340, the routine proceeds to block 310 where a vehicle shutdown procedure may be performed. For example, at block 310, after the processor 48 identifies the facial expression of the driver 12 is a negative facial expression (YES at decision block 320) and sends the vehicle operating command to the vehicle ECU 42, if the vehicle ECU 42 determines that the vehicle 10 is in the on position (YES at decision block 330) and the vehicle 10 is not in park (YES at decision block 340), the vehicle ECU 42 will perform a vehicle shutdown procedure. The vehicle shutdown procedure may include, for example, reducing the speed of the vehicle 10, if the vehicle 10 is in motion, veering onto a shoulder of the road, displaying a notification on the display device 40 that the driver 12 should stop the vehicle 10, or any combination of these actions. The above actions during the vehicle shutdown procedure may occur immediately or after a predetermined period of time to allow for the driver to take action.

When the processor 48 identifies a negative facial expression of the driver 12 and the vehicle ECU 42 performs one of the above actions, such as disabling the vehicle or performing the vehicle shutdown procedure, a notification or message to this effect is presented on the display device 40 alerting the driver 12. In some embodiments, user override may be possible by operation of the display device 40. This may be necessary when the vehicle 10 is not in a safe area or driving situation to be disabled.

Figure 4:
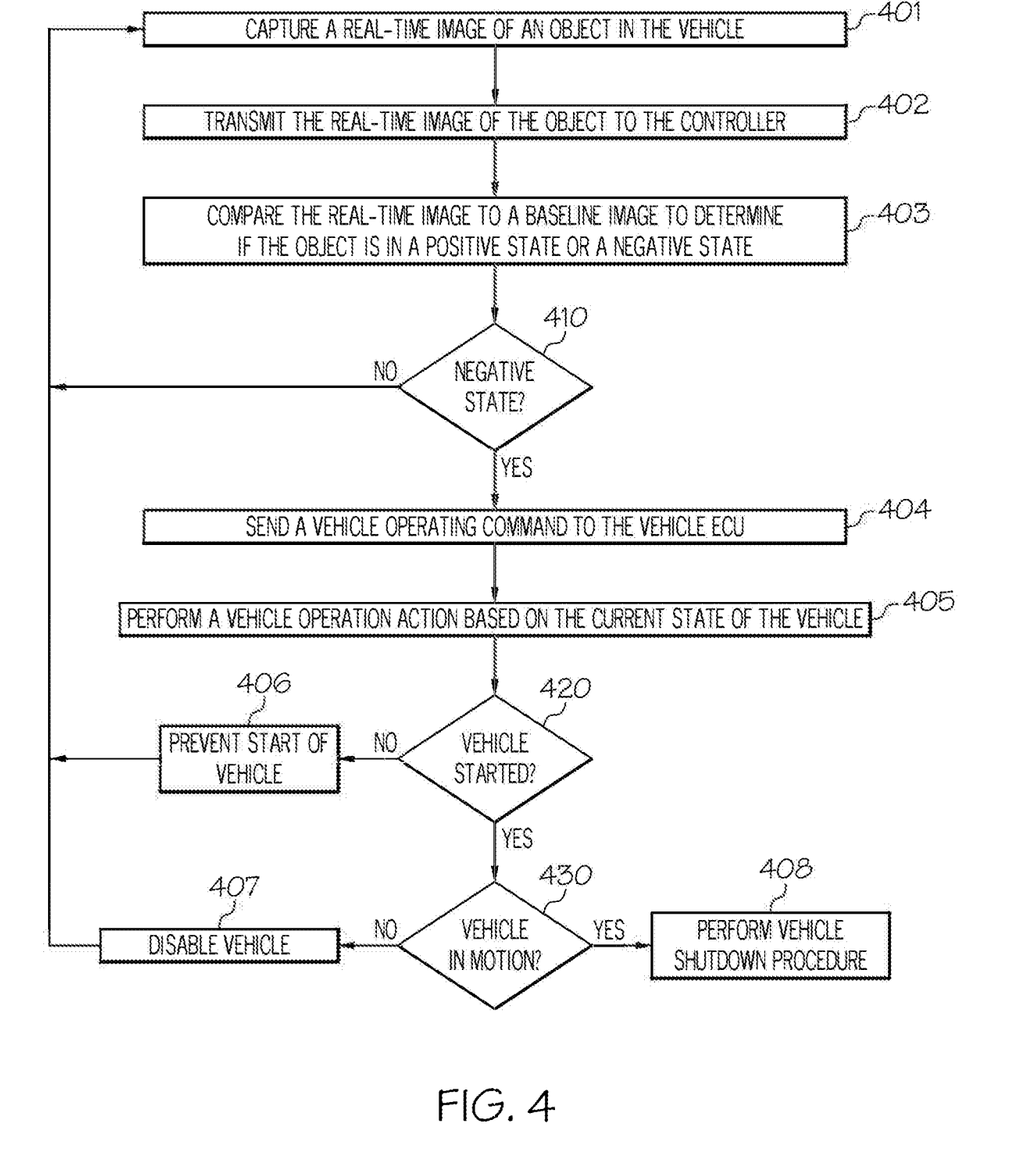
FIG. 4 depicts a flowchart illustrating an embodiment of a method for inhibiting operation of a vehicle based on a state of an object within the vehicle.

FIG. 4 depicts a flow chart of a method for operating a vehicle in accordance with one or more embodiments shown and described herein. More particularly, FIG. 4 depicts a method for restricting or inhibiting operation of a vehicle based on a condition or state of an object within the vehicle.

At block 401, the imaging device 26 monitors an interior of the vehicle 10 in order to capture at least one image of various objects within the vehicle 10. Such objects may include the passenger 16 in the seat 20, the seat belt 28 of the seat 20, the passenger 18 in the car seat 32, the restraining strap 32 of the car seat 24, the vehicle doors 34, 36, or any other object within the vehicle 10 in which operation of the vehicle 10 should be prevented when the object is not in a correct or safe position, referred to herein as a positive state.

For each of the objects identified above, an initial image of the object captured by the imaging device 26 while in an associated positive state is stored within the memory 50 of the controller 38 (e.g., a positive state of the seat belt 28 of the seat 20 is in the buckled position, a positive state of the retraining strap 32 of the car seat 24 is in the buckled position, a positive state of the passengers 16, 18 in the seat 20 or the car seat 24, respectively, is in an upright seated position, and a positive state of the doors 34, 36 is in the closed position). These initial images are referred to herein as baseline images. Alternatively, the baseline image of each object in its associated positive state may be stored within the server 54 and retrieved by the processes 48 via the network 58 when necessary.

In embodiments, during monitoring by the imaging device 26, the imaging device 26 may capture images of the second row seats 20, 22 only when it is determined that the second row seats 20, 22 are occupied by occupants. For example, when the occupant detection sensor 25 provided in at least one of the second row seats, as shown in the seat 22, detects a passenger in the second row seat 22, the imaging device 26 starts capturing images of the passenger 18. When the occupant detection sensor 25 no longer detects a passenger in the second row seat 22, the imaging device 26 stops capturing images of the passenger 18. In some embodiments, the imaging device 26 will perform the initial check to determine if a passenger is in the seat 22. If the imaging device 26 determines that a passenger is present in the second row seat 22, the occupant detection sensor 25 will then verify the presence of the passenger.

In some embodiments, the occupant detection sensor 25 measures a weight of the passenger in the second row seat 22. The occupant detection sensor 25 may transmit the measured weight to the controller 38 of a system 100 and the controller 38 may determine whether the measured weight is greater than a predetermined or baseline weight when a passenger is not present. If it is determined that the weight is greater than the predetermined weight, the imaging device 26 captures images of the passenger 18. If it is determined that the weight is equal to or less than the predetermined weight, the imaging device 26 may not capture images of the passenger 18. As such, when there is no occupant seated in the second row seat 22, or the seat 20 when a second occupant detection sensor is provided, the imaging device 26 does not capture an image of any passenger or objects associated with the second row seats 20, 22. It should also be appreciated that the imaging device 26 may capture an image of the second row seats 20, 22 themselves to determine if the second row seats 20, 22 are in a positive state or a negative state.

At block 402, the imaging device repeatedly transmits images of each of the objects in the vehicle 10 discussed above, other than the seats 20, 22 when no occupant is seated therein, to the processor 48. These images may be referred to as real-time images, as opposed to the baseline images, which are the previously stored images of the objects in their respective positive state. Based on the real-time images transmitted to the controller, the controller will retrieve corresponding baseline images of the objects in the positive state from the memory 50 of the controller 38 or the server 54 as noted above.

At block 403, the processor 48 then compares each real-time image to its corresponding baseline image in order to determine if the image of the object captured in the real-time image differs from the image of the object captured in the baseline image. For example, when an occupant is sitting in the car seat, a real-time image of the retraining strap will be compared to a baseline image of the restraining strap of the car seat when in a positive state. Similarly, the processor will compare baseline images of the doors of the vehicle to real-time images captured of the door of the vehicle to determine if any of the doors are open and, thus, not in the positive state. The processor 48 may implement an image comparison algorithm on the real-time image in view of the baseline image to determine if there are differences between the two. At decision block 410, it is determined whether the object is in a positive state or a negative state. If the object is not determined to be in a negative state at decision block 410, the routine returns to block 410. It should be appreciated that other sensor data provided in the vehicle, that provided by motion detectors, heat sensors. IR sensors, and the like, may be utilized to assist the processor 48 in determining the state of the object.

If the object is determined to be in a negative state at decision block 410, i.e., the processor 48 determines that there are differences between the real-time image and the baseline image greater than a predetermined threshold, the processor 48 will determine that the at least one object is not in a positive state, i.e., a negative state. Thus, at block 404, when the object is determined to be in a negative state, the processor 48 will send a vehicle operating command to the vehicle ECU 42. Nonlimiting examples of a vehicle operating command may include instructions to either prevent start of the vehicle, disable the vehicle, or perform a shutdown procedure, as identified at blocks 406-408 below.

As a result of the vehicle ECU 42 receiving the vehicle operating command, the vehicle ECU 42 performs a vehicle operation action at block 405, such as one of those identified in the instructions of the vehicle operating command, based on the current operation state of the vehicle. At decision block 420, it is determined whether the vehicle is started. If it is determined that the vehicle has started, the routine proceeds to decision block 430, as will be described below. If the vehicle ECU 42 determines in decision block 420 that the is not started (e.g., by determining that an ignition or a battery of the vehicle 10 is in the off position), the vehicle ECU 42 will prevent the ignition or battery from switching to the on position until the processor 48 determines the object that was previously determined to be in the negative state is changed to be in the positive state at block 406. As such, the vehicle 10 is disabled to prevent operation of the vehicle 10 while the object is in the negative state. The routing returns to block 401 from block 406.

At decision block 430, it is determined whether the vehicle 10 is in motion. If the processor 48 determines that the vehicle 10 is not in motion at decision block 430, the routing proceeds to block 407 where the vehicle is disabled. For example, at block 407, after the processor 48 identifies the object is in the negative state and sends the vehicle operating command to the vehicle ECU 42, if the vehicle ECU 42 determines that the vehicle 10 is in the on position (YES at decision block 420) and the vehicle 10 is in park (NO at decision block 430), the vehicle ECU 42 will switch the vehicle to the off position until the processor 48 determines that the object is no longer the negative state.

If the processor 48 determines that the vehicle 10 is in motion at decision block 430, the routine proceeds to block 408 where a vehicle shutdown procedure may be performed. For Example, at block 408, after the processor 48 identifies the object is in the negative state (YES at decision block 410) and sends the vehicle operating command to the vehicle ECU 42, if the vehicle ECU 42 determines that the vehicle 10 is in the on position (YES at block 420) and the vehicle 10 is not in park (YES at decision block 430), the vehicle ECU 42 will perform a vehicle shutdown procedure. The vehicle shutdown procedure may include, for example, reducing the speed of the vehicle 10, if the vehicle 10 is in motion, veering onto a shoulder of the road, displaying a notification that the driver should stop the vehicle 10, or any combination of these actions. The above actions during the vehicle shutdown procedure may occur immediately or after a predetermined period of time to allow for the driver to take action.

When the processor 48 identifies the object is in the negative state and the vehicle ECU 42 performs any of the above actions, such as disabling the vehicle or performing the vehicle shutdown procedure, a notification or message to this effect may be presented on the display device 40 alerting the driver 12. In some embodiments, user override may be possible by operation of the display device 40. This may be necessary when the vehicle 10 is not in a safe area or driving situation to be disabled.

From the above, it is to be appreciated that defined herein is a new and unique system for inhibiting operation of a vehicle when a driver of the vehicle or an object within the vehicle creates an unsafe driving environment.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a vehicle electronic control unit;
   an imaging device; and
   a controller comprising:
      a processor; and
      memory storing computer-readable medium including executable instructions that, when executed by the processor, is configured to:
         capture an image of an operator of a vehicle by the imaging device to determine one or more characteristics of the operator;
         receive a secondary verification signal from a portable device or a server, the secondary verification signal including a second one or more characteristics; and
         compare the one or more characteristics to the second one or more characteristics;
         classify a facial expression of the operator as a positive facial expression or a negative impaired to drive facial expression; and
         transmit a vehicle operation command to the vehicle electronic control unit to perform a vehicle operation action based on the facial expression of the operator and an operation state of the vehicle,
      wherein, when the vehicle is in an off position and the facial expression is classified as the negative impaired to drive facial expression, the vehicle operation action causes the vehicle electronic control unit to prevent the vehicle from switching to an on state.

2. The system of claim 1, wherein the executable instructions, when executed by the processor, cause the controller to implement an image recognition algorithm to determine the one or more characteristics of the operator.

3. The system of claim 2, wherein the one or more characteristics of the operator is stored in the computer-readable medium.

4. The system of claim 2, wherein the facial expression of the operator is determined based on the one or more characteristics.

5. The system of claim 1, wherein:
   when the facial expression is classified as the positive facial expression, the executable instructions, when executed by the processor, permit operation of the vehicle.

6. The system of claim 5, wherein, when the vehicle is in the on state and the vehicle is in park, the vehicle operation action causes the vehicle electronic control unit to switch the vehicle to the off position.

7. The system of claim 5, wherein, when the vehicle is in an on position and the vehicle is in motion, the vehicle operation action causes the vehicle electronic control unit to perform a vehicle shutdown procedure, the vehicle shutdown procedure provides an audible alert and reduces a speed of the vehicle after a predetermined period of time.

8. The system of claim 1, wherein the imaging device includes an audio sensor, the audio sensor assisting in determining the facial expression of the operator.

9. The system of claim 1, wherein the executable instructions, when executed by the processor, cause the controller to:
   learn facial expressions associated with a plurality of occupants; and
   store the learned facial expressions associated with the plurality of occupants.

10. A system comprising:
    a vehicle electronic control unit;
    an imaging device; and
    a controller comprising:
       a processor; and
       memory storing computer-readable medium including executable instructions that, when executed by the processor, is configured to:
          capture an image of an operator of a vehicle by the imaging device to determine one or more characteristics of the operator;
          receive a secondary verification signal from a portable device or a server, the secondary verification signal including a second one or more characteristics; and
          compare the one or more characteristics to the second one or more characteristics;
          classify a facial expression of the operator as a positive facial expression or a negative impaired to drive facial expression; and
          transmit a vehicle operation command to the vehicle electronic control unit to perform a vehicle operation action based on the facial expression of the operator and an operation state of the vehicle,
       wherein, when the vehicle is in an on state, the vehicle is in park, and the facial expression is classified as the negative impaired to drive facial expression, the vehicle operation action causes the vehicle electronic control unit to switch the vehicle to an off position.

11. The system of claim 10, wherein when the vehicle is in an on position and the vehicle is in motion, the vehicle operation action causes the vehicle electronic control unit to perform a vehicle shutdown procedure, the vehicle shutdown procedure provides an audible alert and reduces a speed of the vehicle after a predetermined period of time.

12. A method for inhibiting operation a vehicle, comprising:
    capturing an image of an operator of a vehicle by an imaging device to determine one or more characteristics of the operator;
    receiving a secondary verification signal from a portable device or a server, the secondary verification signal including a second one or more characteristics; and
    comparing the one or more characteristics to the second one or more characteristics;
    classifying a facial expression of the operator as a positive facial expression or a negative impaired to drive facial expression; and
    transmitting a vehicle operation command to a vehicle electronic control unit of the vehicle to perform a vehicle operation action based on the facial expression of the operator and an operation state of the vehicle,
    wherein, when the vehicle is in an off position and the facial expression is classified as the negative impaired to drive facial expression, the vehicle operation action causes the vehicle electronic control unit to prevent the vehicle from switching to an on state.

13. The method of claim 12, wherein, when the vehicle is in an on position and the vehicle is in motion, the vehicle operation action causes the vehicle electronic control unit to perform a vehicle shutdown procedure, the vehicle shutdown procedure providing an audible alert and reducing a speed of the vehicle after a predetermined period of time.

\* \* \* \* \*

UNITED STATES PATENT AND TRADEMARK OFFICE
CERTIFICATE OF CORRECTION

| | |
|---|---|
| PATENT NO. | : 11,373,447 B2 |
| APPLICATION NO. | : 16/794594 |
| DATED | : June 28, 2022 |
| INVENTOR(S) | : Katsumi Nagata and Prathap Alvakonda |

It is certified that error appears in the above-identified patent and that said Letters Patent is hereby corrected as shown below:

On the Title Page

In Column 2, item (56), U.S. patent documents, cite no. 3, delete "Singh" and insert --Singh et al.--, therefor.

In the Specification

In Column 6, Line 34, after "LAN port,", delete "card" and insert --Wi-Fi card--, therefor.

Signed and Sealed this
Twenty-third Day of August, 2022

Katherine Kelly Vidal
*Director of the United States Patent and Trademark Office*